US011919406B2

United States Patent
Tombelli et al.

(10) Patent No.: US 11,919,406 B2
(45) Date of Patent: Mar. 5, 2024

(54) POWER TRANSFER SYSTEM FOR ELECTRIC VEHICLES AND A CONTROL METHOD THEREOF

(71) Applicant: ABB E-MOBILITY B.V., Delft (NL)

(72) Inventors: Fabio Tombelli, Terranuova Bracciolini (IT); Pawel Blaszczyk, Wieliczka (PL); Marco Lega, Montevarchi (IT); Oscar Apeldoorn, Lengnau (CH)

(73) Assignee: ABB E-MOBILITY B.V., Delft (NL)

( * ) Notice: Subject to any disclaimer, the term of this patent is extended or adjusted under 35 U.S.C. 154(b) by 346 days.

(21) Appl. No.: 17/045,602

(22) PCT Filed: Apr. 6, 2018

(86) PCT No.: PCT/EP2018/058930
§ 371 (c)(1),
(2) Date: Oct. 6, 2020

(87) PCT Pub. No.: WO2019/192733
PCT Pub. Date: Oct. 10, 2019

(65) Prior Publication Data
US 2021/0162875 A1  Jun. 3, 2021

(51) Int. Cl.
*H02J 50/80* (2016.01)
*B60L 53/12* (2019.01)
(Continued)

(52) U.S. Cl.
CPC .............. *B60L 53/12* (2019.02); *B60L 53/122* (2019.02); *H02J 7/00034* (2020.01); *H02J 50/12* (2016.02); *H02J 50/80* (2016.02)

(58) Field of Classification Search
CPC .... B60L 53/12; B60L 53/122; H02J 7/00034; H02J 50/12; H02J 50/80; Y02T 10/70; Y02T 10/7072; Y02T 90/14
See application file for complete search history.

(56) References Cited

U.S. PATENT DOCUMENTS 9,184,633 B2  11/2015  Obayashi
9,437,362 B2   9/2016  Kim
(Continued)

FOREIGN PATENT DOCUMENTS

CN  107618388 A  1/2018
CN  107750412 A  3/2018
(Continued)

OTHER PUBLICATIONS

European Patent Office, International Search Report & Written Opinion issued in corresponding Application No. PCT/EP2018/058930, dated Dec. 20, 2018, 17 pp.
(Continued)

*Primary Examiner* — Jared Fureman
*Assistant Examiner* — Michael J Warmflash
(74) *Attorney, Agent, or Firm* — Armstrong Teasdale LLP

(57) ABSTRACT

Power transfer system for supplying electric power to a battery of an electric vehicle including a control architecture capable of controlling the transmission of electric power to a battery of said electric vehicle and, at the same time, capable of providing fast responsive control functionalities. In a further aspect, the application relates to a method for controlling a power transfer system.

14 Claims, 5 Drawing Sheets

Figure 1:
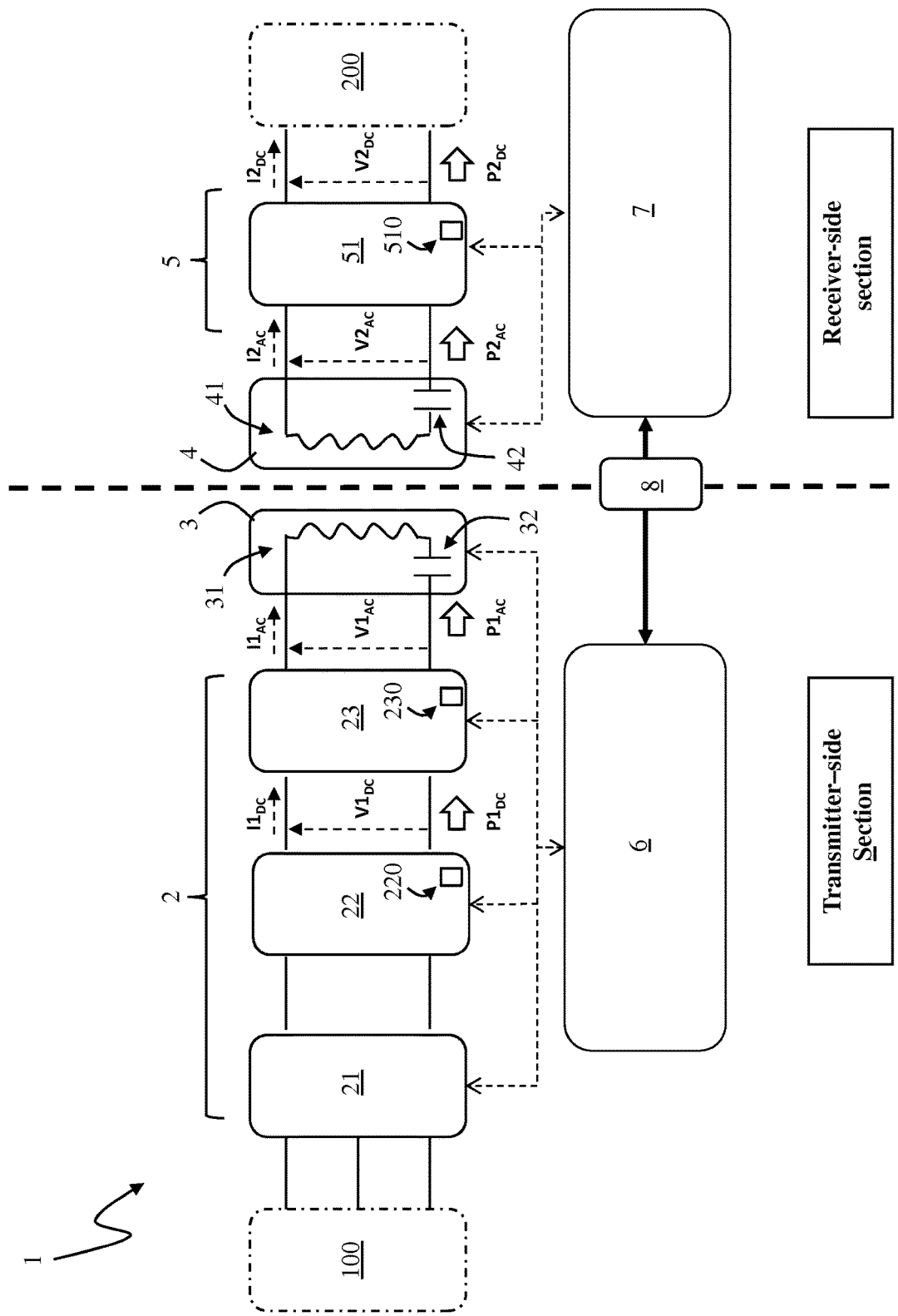
Figure 2:
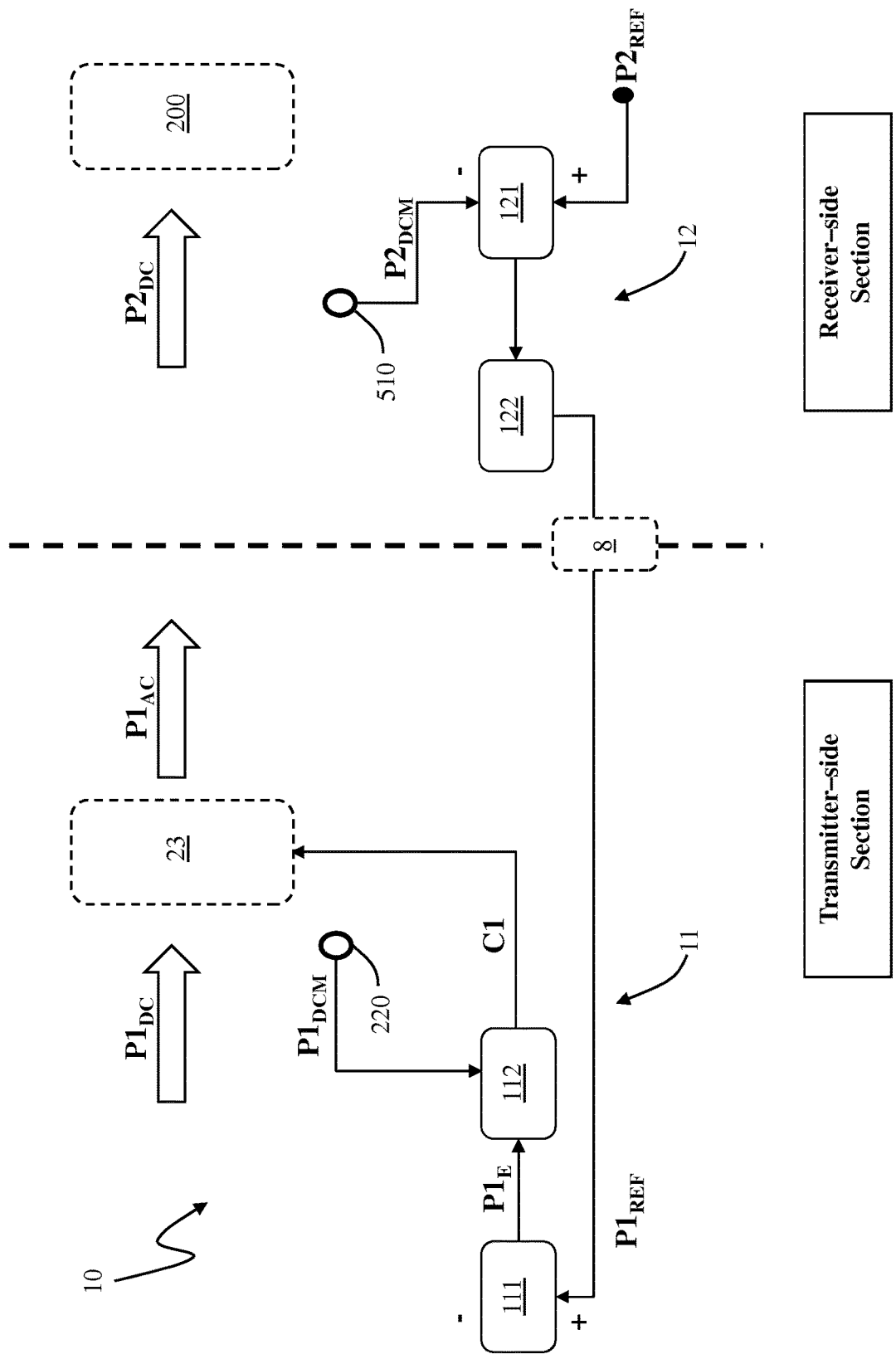
Figure 3:
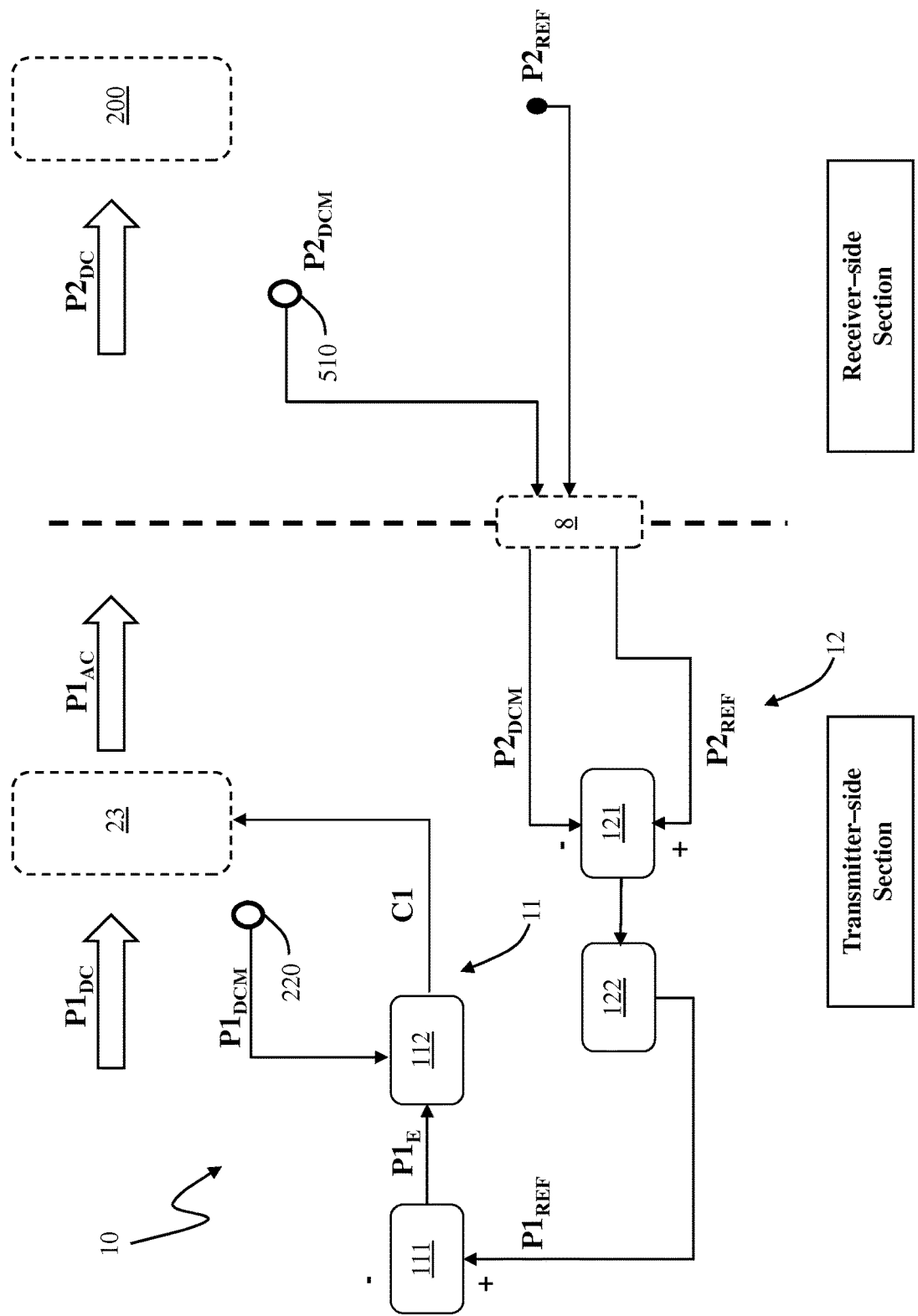
Figure 4:
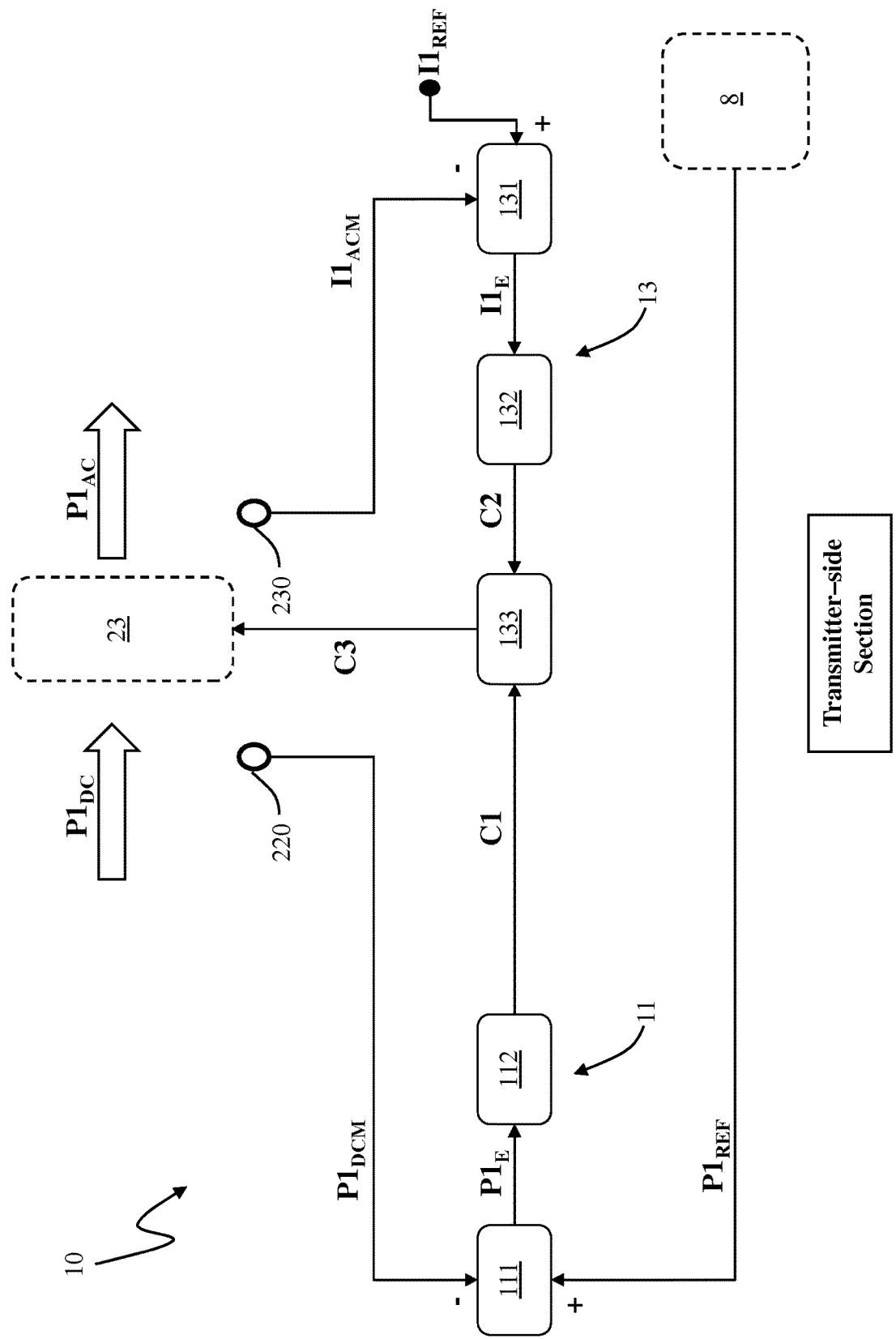
Figure 5:
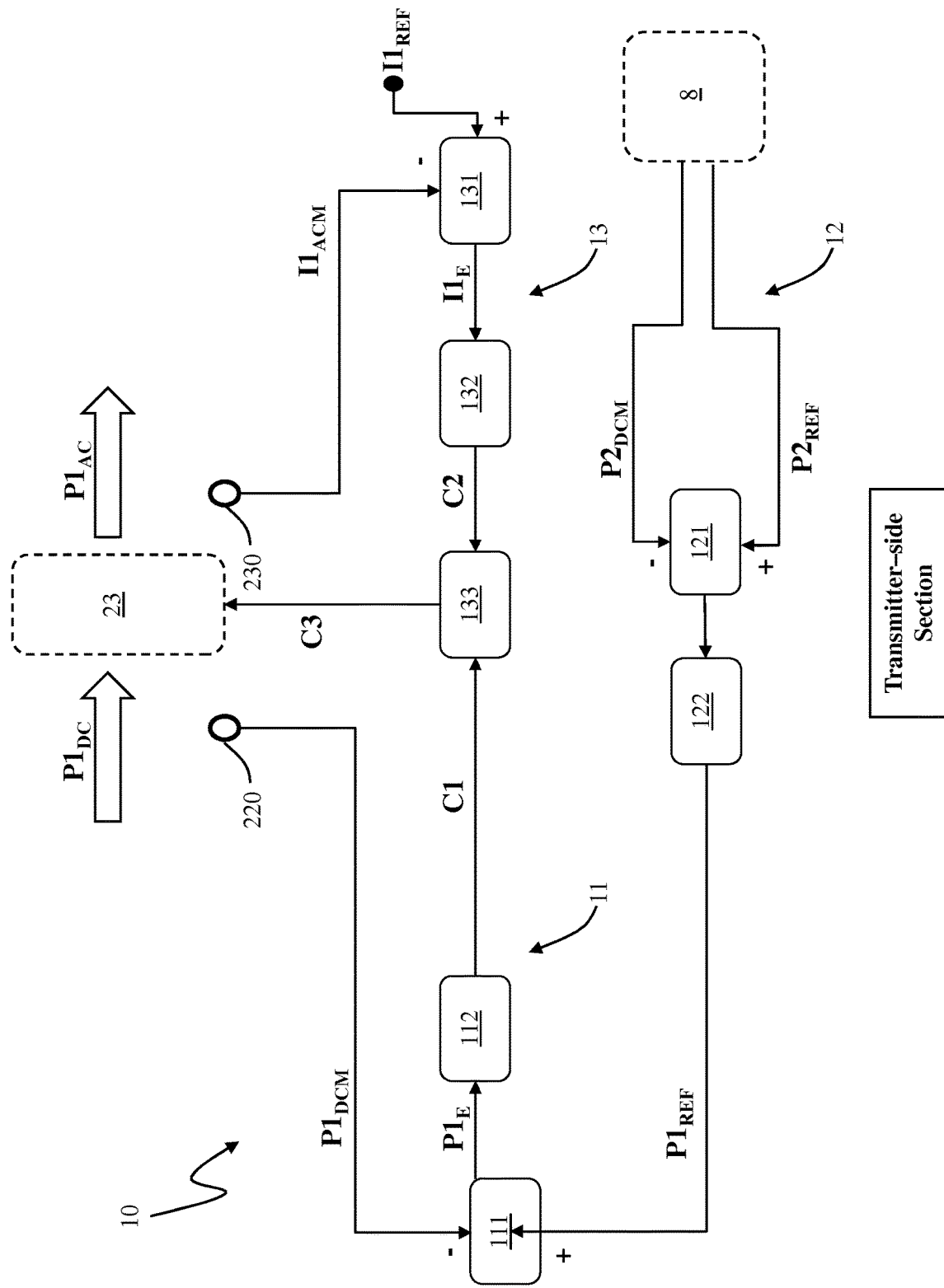

(51) Int. Cl.
*B60L 53/122* (2019.01)
*H02J 7/00* (2006.01)
*H02J 50/12* (2016.01)

(56) References Cited

U.S. PATENT DOCUMENTS

| | | | |
|---|---|---|---|
| 9,843,199 B2* | 12/2017 | Bosshard | B60L 53/126 |
| 10,097,045 B2 | 10/2018 | Guidi | |
| 2004/0201361 A1* | 10/2004 | Koh | H02J 50/10 |
| | | | 320/104 |
| 2009/0174263 A1 | 7/2009 | Baarman | |
| 2012/0286724 A1 | 11/2012 | Tsai | |
| 2013/0033228 A1 | 2/2013 | Raedy | |
| 2013/0063160 A1 | 3/2013 | Nakano | |
| 2013/0119925 A1 | 5/2013 | Kawamura | |
| 2013/0249480 A1 | 9/2013 | Paparo | |
| 2014/0042967 A1* | 2/2014 | Herzog | B60L 53/31 |
| | | | 320/109 |
| 2014/0159501 A1 | 6/2014 | Kanno | |
| 2014/0340027 A1* | 11/2014 | Keeling | B60L 53/36 |
| | | | 320/108 |
| 2015/0214748 A1* | 7/2015 | Lin | H02J 50/10 |
| | | | 307/104 |
| 2015/0280455 A1* | 10/2015 | Bosshard | B60L 53/122 |
| | | | 307/104 |
| 2015/0303714 A1 | 10/2015 | Keeling | |
| 2015/0318900 A1 | 11/2015 | Shimokawa | |
| 2017/0025903 A1 | 1/2017 | Song | |
| 2017/0267111 A1 | 9/2017 | Ochi | |
| 2017/0338685 A1* | 11/2017 | Jung | H02J 50/90 |
| 2018/0241223 A1* | 8/2018 | Bae | H04B 5/0037 |
| 2018/0342878 A1 | 11/2018 | Nagaoka | |
| 2018/0358843 A1 | 12/2018 | Misawa | |
| 2021/0162875 A1 | 6/2021 | Tombelli | |

FOREIGN PATENT DOCUMENTS

| | | |
|---|---|---|
| EP | 2530812 A1 | 12/2012 |
| KR | 20140031709 A | 3/2014 |
| WO | 2012005607 A2 | 1/2012 |
| WO | 2017026721 A1 | 2/2017 |

OTHER PUBLICATIONS

European Patent Office, International Search Report & Written Opinion issued in corresponding Application No. PCT/EP2018/060318, dated Dec. 20, 2018, 15 pp.

European Patent Office, International Search Report & Written Opinion issued in corresponding Application No. PCT/EP2018/058396, dated Dec. 20, 2018, 17 pp.

* cited by examiner

POWER TRANSFER SYSTEM FOR ELECTRIC VEHICLES AND A CONTROL METHOD THEREOF

The present invention relates to the field of power transfer systems for electric vehicles. In particular, the present invention regards an inductive power transfer system capable of exchanging electric power between an electric power system and a battery on board an electric vehicle, in a wireless manner.

Wireless inductive power transfer systems for electric vehicles are well known in the state of the art.

Typically, these systems are used to charge the electric battery of an electric vehicle.

When used as a battery charging systems, wireless inductive power transfer systems employ a transmitter coil, which is placed on or embedded in a ground surface, to inductively transmit electric power to a receiver coil mounted on board an electric vehicle through the air gap between the road surface and the vehicle itself.

As in traditional transformers, an AC current flowing in the winding of the transmitter coil produces a magnetic flux making an induced AC current to flow in the winding of the receiver coil. In this way, electric power may be inductively transferred from the transmitter coil to the receiver coil.

When used as battery charging systems, wireless power transfer systems for electric vehicles typically include a transmitter-side section, which normally includes the transmitter coil and a power supply system connectable to the mains to feed the transmitter coil, and a receiver-side section, which normally includes, on board the electric vehicle, the receiver coil and a power conversion system to feed the battery with electric power inductively received by the receiver coil.

Both the transmitter-side section and the receiver-side section of the power transfer system include a number of controllers to control their operation. Controllers arranged at different sections can mutually communicate through a dedicated communication channel, which is typically a wireless communication channel, e.g. of the Wi-Fi type.

In order to ensure a suitable charging process of the battery on board the electric vehicle, electric power transferred to the battery has to be properly controlled according to a charging profile that is typically set-up depending on the characteristics and state-of-charge of the battery and on other additional aspects, such as the reduction of the energy consumption during a charging cycle, the reduction of the time required for the charging process, and the like.

In order to follow up said power transfer profile, electric power transmitted between the transmitter coil to the receiver coil needs to be properly controlled.

For this reason, controllers of a wireless power transfer system for electric vehicles typically implement a closed-loop control architecture configured to control the operation of the above-mentioned power supplying system as a function of the selected power transfer profile.

Control arrangements currently used in power transfer systems of the state of the art often show poor performances in terms of reliability, in particular when safety control functionalities, such the rapid shut-down of the power supplying system in case of faults (e.g. a fault in a component of the transmitter-side section), are requested.

The main aim of the present invention is to provide a wireless power transfer system for electric vehicles, which allows overcoming the above-described disadvantages.

Within this aim, another object of the present invention is to provide a wireless power transfer system ensuring a suitable transmission of electric power to the battery on board a vehicle, in accordance with a given power transfer profile.

Another object of the present invention is to provide a wireless power transfer system ensuring good performances in terms of reliability, even when safety control functionalities are requested for implementation.

Another object of the present invention is to provide a wireless power transfer system relatively easy and inexpensive to arrange and produce at industrial level.

The above aim and objects, together with other objects that will be more apparent from the subsequent description and from the accompanying drawings, are achieved by a power transfer system for electric vehicles according to the following claim 1 and the related dependent claims.

In general definition, the power transfer system, according to the invention, comprises:

- a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;
- a transmitter-side coil sub-system electrically coupled with said inverter stage and adapted to receive said first AC power, said transmitter-side coil sub-system comprising a transmitter coil adapted to receive a first AC current;
- one or more transmitter-side controllers adapted to control operation of said transmitter-side power sub-system and transmitter-side coil sub-system;
- a receiver-side coil sub-system comprising a receiver coil inductively coupleable with said transmitter coil, said receiver-side coil sub-system being adapted to exchange an AC power with said transmitter-side coil sub-system;
- a receiver-side power sub-system comprising a second rectifying stage electrically coupled with said receiver-side coil sub-system and adapted to a second AC power with said receiver-side coil sub-system, said second rectifying stage being electrically coupleable with said battery and adapted to provide a second DC power to said battery;
- one or more receiver-side controllers adapted to control operation of said receiver-side coil sub-system and receiver-side power sub-system, said transmitter-side and receiver-side controllers being capable to mutually communicate through a wireless communication channel.

According to the invention, said transmitter-side and receiver-side controllers implement a control architecture adapted to control the second DC power received by said battery and adapted to provide fast responsive control functionalities of the first DC power provided by said DC-bus stage by controlling operation of at least one of said rectifying stage and said DC-bus stage.

According to an aspect of the invention, said control architecture is adapted to control the first DC power provided by said DC-bus stage. In particular, said control architecture is configured to receive and process a first signal indicative of desired values for said first DC power and a first detection signal indicative of measured values of said first DC power and provide a first control signal to control operation of at least one of said rectifying stage and said DC-bus stage.

According to an aspect of the invention, said control architecture is adapted to control the second DC power received by said battery. In particular, said control architecture is configured to receive and process a second signal indicative of desired values for said second DC power and a second detection signal indicative of measured values of said second DC power and provide said first signal.

According to an aspect of the invention, said control architecture is adapted to control a first AC current provided by said inverter stage. In particular, said control architecture is configured to receive and process a third signal indicative of desired values for said first AC current and a third detection signal indicative of measured values of said first AC current and calculate a second control signal. Said control architecture is further configured to process said first and second control signals to provide a third control signal to control operation of at least one of said rectifying stage and said first DC-bus stage.

In a further aspect, the present invention related to a control method for a power transfer system according to the following claim 11 and the related dependent claims.

Said power transfer system comprises:
- a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;
- a transmitter-side coil sub-system electrically coupled with said inverter stage and adapted to receive said first AC power, said transmitter-side coil sub-system comprising a transmitter coil adapted to receive a first AC current;
- one or more transmitter-side controllers adapted to control operation of said transmitter-side power sub-system and transmitter-side coil sub-system;
- a receiver-side coil sub-system comprising a receiver coil inductively coupleable with said transmitter coil, said receiver-side coil sub-system being adapted to exchange an AC power with said transmitter-side coil sub-system;
- a receiver-side power sub-system comprising a second rectifying stage electrically coupled with said receiver-side coil sub-system and adapted to exchange a second AC power with said receiver-side coil sub-system, said second rectifying stage being electrically coupleable with said battery and adapted to provide a second DC power to said battery;
- one or more receiver-side controllers adapted to control operation of said receiver-side coil sub-system and receiver-side power sub-system, said transmitter-side and receiver-side controllers being capable to mutually communicate through a wireless communication channel.

The method, according to the invention, comprises controlling the second DC power received by said battery and providing fast responsive control functionalities of the first DC power provided by said DC-bus stage by controlling operation of at least one of said rectifying stage and said DC-bus stage.

Preferably, the method, according to the invention, comprises controlling the first DC power received by said DC-bus stage by receiving and processing a first signal indicative of desired values for said first DC power and a first detection signal indicative of measured values of said first DC power and by providing a first control signal to control operation of at least one of said rectifying stage and said DC-bus stage.

Preferably, the method, according to the invention, comprises controlling the second DC power received by said battery by receiving and processing a second signal indicative of desired values for said second DC power and a second detection signal indicative of measured values of said second DC power and providing said first signal.

Preferably, the method, according to the invention, comprises controlling a first AC current provided by said inverter stage by receiving and processing a third signal indicative of desired values for said first AC current and a third detection signal indicative of measured values of said first AC current, calculating a second control signal and processing said first and second control signals to provide a third control signal to control operation of at least one of said rectifying stage and said DC-bus stage.

Further characteristics and advantages of the present invention will be more apparent with reference to the description given below and to the accompanying figures, provided purely for explanatory and non-limiting purposes, wherein:

FIG. 1 schematically illustrates the power transfer system, according to the present invention;

FIGS. 2-5 schematically illustrate some control arrangements employed in the power transfer system, according to the present invention.

With reference to FIG. 1, the present invention refers to a power transfer system 1 for electric vehicles capable of exchanging electric power between an electric power system 100 (e.g. the mains) and a battery 200 on board an electric vehicle, in a wireless manner.

The power transfer system 1 is particularly adapted to be used as a battery charging system capable of transferring electric power harvested from an electric power system 100 to a battery 200 on board an electric vehicle and it will be described with specific reference to this application for the sake of simplicity.

However, the power transfer system 1 may be suitable to implement bidirectional power transfer functionalities and therefore it may be employed to transfer electric power from the battery 200 to the electric system 100.

Referring to its application as battery charging system, the power transfer system 1 comprises a transmitter-side section and a receiver-side section, which respectively include a number of power sub-systems and components arranged off-board and on-board the electric vehicle.

At the transmitter-side section, the power transfer system 1 comprises a transmitter-side power sub-system 2 electrically coupleable with the electric power system 100.

The transmitter-side power sub-system 2 comprises a first AC/DC rectifying stage 21 electrically coupleable with the electric power system 100 and adapted to receive AC electric power from the power system 100 and to provide DC electric power.

Preferably, the first rectifying stage 21 includes a filter and a switching converter (not shown) electrically coupled in cascade to provide a suitable filtering and rectification of the currents and voltages received from the electric power system 100.

Preferably, the first rectifying stage 21 includes power switches controllable by means of a suitable control signal.

The transmitter-side power sub-system 2 further comprises a DC-bus stage 22 electrically coupled with the first rectifying stage 21 to be powered by this latter.

Conveniently, the DC-bus stage 22 is adapted to transmit DC electric power received from the first rectifying stage 21 and to provide a first DC power $P1_{DC}$, more particularly a first DC current $I1_{DC}$ and a first DC voltage $V1_{DC}$.

In some embodiments of the invention, the bus-stage 22 may comprise a capacitive circuit (e.g. a so-called DC-link circuit) to suitably store and make available the electric energy received from the rectifying stage 21. In this case, the amplitude of the first DC current $I1_{DC}$ and of the first DC voltage $V1_{DC}$ (and therefore the first DC power $P1_{DC}$) provided by the DC bus-stage 22 may be controlled by suitably tuning the duty-cycle of the power switches of the first rectifying stage 21.

In alternative embodiments, the bus-stage 22 may include a DC-DC switching converter (e.g. a buck switching converter) that conveniently includes power switches controllable by means of a suitable control signal.

In this case, the amplitude of the first DC current $I1_{DC}$ and of the first DC voltage $V1_{DC}$ (and therefore the first DC power $P1_{DC}$) provided by the DC-bus stage 22 may be controlled by suitably tuning the duty-cycle of the power switches of the said DC-DC switching converter and, possibly, of the first rectifying stage 21.

Preferably, the DC-bus stage 22 comprises a first sensing arrangement 220 adapted to detect the first DC current $I1_{DC}$ and the first DC voltage $V1_{DC}$ and provide detection signals indicative of the first DC power $P1_{DC}$.

The transmitter-side power sub-system 2 further comprises a DC/AC inverter stage 23 electrically coupled with the first DC-bus stage 22.

The inverter stage 23 is adapted to receive the first DC power $P1_{DC}$, more particularly the first DC current $I1_{DC}$ and the first DC voltage $V1_{DC}$, provided by the DC-bus stage 22, and to provide a first AC power $P1_{AC}$, more particularly a first AC current $I1_{AC}$ and a first AC voltage $V1_{AC}$.

Preferably, the inverter stage 23 comprises a DC/AC switching converter including power switches controllable by means of a suitable control signal.

The frequency of the first AC current $I1_{AC}$ and of the first AC voltage $V1_{AC}$ provided by the inverter stage 23 may be controlled by suitably tuning the frequency of the power switches of such an electronic stage.

Preferably, the inverter stage 23 comprises a second sensing arrangement 230 adapted to detect the first AC current $I1_{AC}$ and provide detection signals indicative of said current.

At the transmitter-side section, the power transfer system 1 comprises a transmitter-side coil sub-system 3 electrically coupled with the inverter stage 23 and adapted to receive a first AC power $P1_{AC}$, more particularly a first AC current $I1_{AC}$ and a first AC voltage $V1_{AC}$, provided by the inverter stage 23.

The transmitter-side coil sub-system 3 comprises a transmitter coil 31 adapted to receive the first AC current $I1_{AC}$ provided by the inverter stage 23.

Preferably, the transmitter-side coil sub-system 3 comprises also a first resonant capacitor 32 electrically coupled (e.g. in series as shown in FIG. 1) with the transmitter coil 31.

Preferably, the transmitter-side coil sub-system 3 comprises auxiliary circuits (not shown) operatively associated with the transmitter coil 31, e.g. electronic circuits including temperature sensors, and the like.

At the transmitter-side section, the power transfer system 1 comprises one or more transmitter-side controllers (collectively indicated by the reference number 6) to control the operation of the transmitter-side power sub-system 2 and of the transmitter-side coil sub-system 3.

As an example, the transmitter-side controllers 6 may include a controller to control the operation of the rectifying stage 21, a controller to control the operation of the bus stage 22 (when including a DC-Dc switching converter), a controller to control the operation of the inverter stage 23 and a controller to control the operation of possible auxiliary circuits included in the transmitter-side coil sub-system 3.

In a practical implementation of the invention, the transmitter-side power sub-system 2 may be arranged in a wallbox device for an electric vehicle charging facility, e.g. for residential purposes. Such a wall-box device may conveniently include the transmitter-side controllers 6 operatively associated with the electronic stages of the transmitter-side power sub-system 2. The transmitter-side coil sub-system 3 may instead be arranged or embedded in a ground pad device for an electric vehicle charging facility, e.g. for residential purposes. Such a ground pad device may conveniently include possible transmitter-side controllers 6 operatively associated to transmitter-side coil sub-system 3.

At the receiver-side section, the power transfer system 1 comprises a receiver-side coil sub-system 4 comprising a receiver coil 41 inductively coupleable with the transmitter coil 31. When the transmitter coil 31 and the receiver coil 41 are inductively coupled (obviously with an air gap in therebetween), a first AC current $I1_{AC}$ flowing along the transmitter coil 31 produces a magnetic flux making an induced second AC current $I2_{AC}$ to flow along the receiver coil 41. In this way, electric power may be inductively exchanged between the transmitter coil 31 and the receiver coil 41.

The receiver-side coil sub-system 4 is thus adapted to exchange an AC power with transmitter-side coil sub-system 3 and provide a second AC current $I2_{AC}$ and a second AC voltage $V2_{AC}$.

Due to magnetic coupling losses, electric power is exchanged between the transmitter coil 31 and the receiver coil 41 with efficiency values $\eta<1$.

A second AC power $P2_{AC}$ at the receiver-side coil sub-system 4 may thus be lower than the first AC power $P1_{AC}$ at the transmitter-side coil sub-system 3.

Preferably, the receiver-side coil sub-system 4 comprises a second resonant capacitor 42 electrically coupled (e.g. in series as shown in FIG. 1) with the receiver coil 41.

Preferably, resonant capacitors 32, 42 are conveniently designed to form a resonant RLC circuit together with the inductance of transmitter coils 31, 41 and the equivalent impedance seen at the output terminals of the receiver-side coil sub-system 4.

By operating the inverter stage 23 in such a way that the first AC current $I1_{AC}$ flowing along the transmitter coil 31 has a fundamental frequency close or corresponding to the resonant frequency of such a resonant circuit, electric power may be exchanged between the transmitter-side coil sub-system 3 and the receiver-side coil sub-system 4 with high efficiency values despite of the necessarily large air gap between the transmitter coil 31 and the receiver coil 41. Additionally, the amplitude of the first AC current $I1_{AC}$ flowing along the transmitter coil 31 can be reduced or minimized due to nearly-zero phase shift between said current and the first AC voltage $V1_{AC}$.

Preferably, the receiver-side coil sub-system 4 comprises auxiliary circuits (not shown) operatively associated with the receiver coil 41, e.g. electronic circuits including temperature sensors, and the like.

At the receiver-side section, the power transfer system 1 comprises a receiver-side power sub-system 5 comprising a second rectifying stage 51 electrically coupled with the receiver-side coil sub-system 4 and adapted to exchange the second AC power $P2_{AC}$ with the receiver-side coil sub-system 4.

Preferably, the second rectifying stage 51 includes a full-wave diode bridge electrically coupled in cascade with a filter to provide a suitable rectification and filtering of the second AC current $I2_{AC}$ and second AC voltage $V2_{AC}$ received from the receiver-side coil sub-system 4.

As an alternative embodiment, the second rectifying stage 51 may include a switching converter and a filter (not shown) electrically coupled in cascade to provide a suitable rectification and filtering of the currents and voltages received from the receiver-side coil sub-system 4. In this case, the second rectifying stage 51 may include power switches controllable by means of a suitable control signal.

The second rectifying stage 51 is electrically coupleable with the battery 200 and is adapted to provide a second DC power $P2_{DC}$ to said battery, more particularly a second DC current $I2_{DC}$ and a second DC voltage $V2_{DC}$.

Preferably, the second rectifying stage 51 comprises a suitable sensing arrangement 510 adapted to detect the second DC current $I2_{DC}$ and the second DC voltage $V2_{DC}$ and to provide detection signals indicative of second DC power $P2_{DC}$ received by the battery 200.

At the receiver-side section, the power transfer system 1 comprises one or more receiver-side controllers (collectively indicated by the reference number 7) to control operation of the receiver-side power sub-system 5 and of the receiver-side coil sub-system 4.

As an example, receiver-side controllers 7 may include a controller to control the operation of the rectifying stage 51 and a controller to control the operation of the auxiliary circuits included in the receiver-side coil sub-system 4.

According to the invention, the power transfer system 1 comprises at least a wireless communication channel 8, through which the transmitter-side and receiver-side controllers 6, 7 are capable to mutually communicate. As an example, a communication protocol may be adopted for the communication channel 8.

In a practical implementation of the invention, the receiver-side coil sub-system 4, the receiver-side power sub-system 5 and the receiver-side controllers 7 are arranged (together with the battery 200) on board an electric vehicle.

According to the invention, the transmitter-side and receiver-side controllers 6, 7 implement a control architecture 10 including control arrangements capable of suitably controlling the transmission of electric power to the battery 200 and, at the same time, providing fast responsive control functionalities, particularly suitable for the implementation of safety functionalities, such as rapid shut-down functionalities and the like.

More particularly, the control architecture 10 is adapted to control the second DC power $P2_{DC}$ received by the battery 200 and to provide fast responsive control functionalities of the first DC power $P1_{DC}$ provided by the DC-bus stage 22 by controlling the operation of at least one of the rectifying stage 21 and the DC-bus stage 22.

In a preferred embodiment, the control architecture 10 comprises a first control arrangement 11 adapted to control the first DC power $P1_{DC}$ provided by the DC-bus stage 22.

The first control arrangement 11 is configured to receive and process a first signal $P1_{REF}$ indicative of desired values for the first DC power $P1_{DC}$ and a first detection signal $P1_{DCM}$ indicative of measured values of the first DC power $P1_{DC}$.

Preferably, the first signal $P1_{REF}$ is a reference signal indicative of reference values for the first DC power $P1_{DC}$. As an alternative, the first signal $P1_{REF}$ may be a signal indicating to increase or decrease the first DC power $P1_{DC}$ provided by the DC-bus stage 22.

Conveniently, the first detection signal $P1_{DCM}$ is provided by the sensing arrangement 220 included in the DC-bus stage 22 whereas, as it will better emerge from the following, the first signal $P1_{REF}$ is provided by another control arrangement 12 of the control architecture 10.

The first control arrangement 11 is configured to provide a first control signal C1 to control the operation of at least one between the rectifying stage 21 and the DC-bus stage 22.

More particularly, when the DC-bus stage 22 does not include a DC-DC switching converter, the first control arrangement 11 is configured to provide a first control signal C1 to control the operation of the rectifying stage 21 whereas, when the DC-bus stage 22 includes a DC-DC switching converter, the first control arrangement 11 is configured to provide a first control signal C1 to control the operation of one between the rectifying stage 21 and the DC-bus stage 22 or of both these electronic stages.

Conveniently, the first control signal C1 is adapted to control the duty-cycle of the power switches included in at least one of the rectifying stage 21 and the DC-bus stage 22.

Preferably, the control arrangement 11 is configured to form a first closed-loop control arrangement capable of controlling the first DC power $P1_{DC}$ provided by the DC-bus stage 22 by suitably controlling the amplitude of the voltages and currents provided by at least one of the rectifying stage 21 and the DC-bus stage 22.

According to an embodiment of the invention, the first control arrangement 11 comprises a first control module 111 and a second control module 112 logically arranged in cascade.

The first control module 111 is configured to receive and process the first signal $P1_{REF}$ and the first detection signal $P1_{DCM}$ and to provide a first error signal $P1_E$, which may be indicative of a difference between the first signal $P1_{REF}$ and the first detection signal $P1_{DCM}$.

The second control module 112 is configured to receive and process the first error signal $P1_E$ and provide the first control signal C1.

According to an important aspect of the invention, the first control arrangement 11 is implemented at level of the transmitter-side controllers 6.

In this case, the first control arrangement 11 may include control modules suitably implemented by executable sets of software instructions stored by the transmitter-side receivers 6.

The first control arrangement 11 is thus capable of providing fast control functionalities of the first DC power $P1_{DC}$ provided by the DC-bus stage 22, which are fully compatible with the implementation of safety functionalities, such as the rapid-shut down of the rectifying stage 21 and/or the DC-bus stage 22.

According to the above-mentioned preferred embodiment, the control architecture 10 comprises a second control arrangement 12 adapted to control the second DC power $P2_{DC}$ received by the battery 200.

The second control arrangement 12 is configured to receive and process a second signal $P2_{REF}$ indicative of desired values for the second DC power $P2_{DC}$ and a second detection signal $P2_{DCM}$ indicative of measured values of the second DC power $P2_{DC}$.

Preferably, the second signal $P2_{REF}$ is a reference signal indicative of reference values for the first DC power $P1_{DC}$. As an alternative, the second signal $P2_{REF}$ may be a signal indicating to increase or decrease the first DC power $P1_{DC}$ provided by the DC-bus stage 22.

Conveniently, the second detection signal $P2_{DCM}$ is provided by the sensing arrangement 510 included in the second rectifying stage 51 whereas the second signal $P2_{REF}$ is provided by the second one or more controllers 7 in accordance with a power transfer profile selected for the battery 200.

Preferably, the second control arrangement 12 is configured to provide the first signal $P1_{REF}$ for the first control arrangement 11. In this way, the second control arrangement 12 operates concurrently with the first control arrangement 11 to control the second DC power $P2_{DC}$ received by the battery 200 and it provides the first signal $P1_{REF}$ to be processed by the first control arrangement 11 to control the amplitude of the voltages and currents provided by at least one of the rectifying stage 21 and the DC-bus stage 22.

In the implementation of the second control arrangement 12, certain signals, such as the second signal $P2_{REF}$ and the second detection signal $P2_{DCM}$ or the first signal $P1_{REF}$, are transmitted by the receiver-side controllers 7 to the transmitter-side controllers 6 through the wireless communication channel 8 to provide the first signal $P1_{REF}$.

The second control arrangement 12 is thus capable of responding to a variation of the second DC power $P2_{DC}$ received by the battery 200 with relatively long response times (in the order of tens of ms), which are anyway fully compatible with the implementation of power control functionalities for the battery 200.

Preferably, the second control arrangement 12 is configured to form a second closed-loop control arrangement to control the second DC power $P2_{DC}$ received by the battery 200 by suitably controlling the amplitude of the voltages and currents provided by at least one of the rectifying stage 21 and the DC-bus stage 22.

According to an embodiment of the invention, the second control arrangement 12 comprises a third control module 121 and a fourth control module 122 logically arranged in cascade.

The third control module 121 is configured to receive and process the second signal $P2_{REF}$ and the second detection signal $P2_{DCM}$ and provide a second error signal $P2_E$, which may be indicative of a difference between the second signal $P2_{REF}$ and the second detection signal $P2_{DCM}$.

The fourth processing module 122 is configured to receive and process the second error signal $P2_E$ and provide the first signal $P1_{REF}$.

According to an alternative embodiment of the invention (FIG. 2), the second control arrangement 12 is implemented at level of the receiver-side controllers 7. In this case, the second control arrangement 12 may include control modules conveniently implemented by executable sets of software instructions stored by the receiver-side controllers 7. Additionally, the transmitter-side controllers 6 are adapted to receive the first signal $P1_{REF}$ from the one or more receiver-side controllers 7 through the wireless communication channel 8.

According to an embodiment of the invention (FIG. 3), the second control arrangement 12 is implemented at level of the transmitter-side controllers 6. In this case, the second control arrangement 12 may include control modules conveniently implemented by executable sets of software instructions stored by the transmitter-side controllers 6. Additionally, the transmitter-side controllers 6 are adapted to receive the second signal $P2_{REF}$ and the second detection signal $P2_{DCM}$ from the one or more receiver-side controllers 7 through the wireless communication channel 8.

According to some embodiments of the invention (FIGS. 4-5), the control architecture 10 comprises a third control arrangement 13 to control the first AC current $I1_{AC}$ provided by the inverter stage 23.

The third control arrangement 13 is configured to receive and process a third signal $I1_{REF}$ indicative of desired values (e.g. threshold values) for the first AC current $I1_{AC}$ and a third detection signal $I1_{ACM}$ indicative of measured values of the first AC current $I1_{AC}$.

The third control arrangement 13 is configured to calculate a second control signal C2 by suitably processing the third signal $I1_{REF}$ and the third detection signal $I1_{ACM}$.

Additionally, the third control arrangement 13 is configured to process the first control signal C1 provided by the first control arrangement 11 and the calculated second control signal C2 to provide a third control signal C3 to control the operation of the rectifying stage 23 or the first DC-bus stage 22.

As it is evident from the above, the third control arrangement 13 forms a third closed-loop control arrangement capable of controlling the first AC current $I1_{AC}$ provided by the inverter stage 23 by suitably controlling the amplitude of the voltages and currents provided by at least one of the rectifying stage 21 and the DC-bus stage 22.

Preferably, the third control arrangement 13 intervenes if the first AC current $I1_{AC}$ provided by the inverter stage 23 exceeds the values provided by the current reference signal $I1_{RF}$. In this case, the third control arrangement 13 provides the second control signal C3 that is conveniently obtained by correcting the control signal C1 provided by the first control arrangement 11.

Preferably, the third control arrangement 13 does not intervene to correct the control signal C1, if the first AC current $I1_{AC}$ provided by the inverter stage 23 does not exceed the values provided by the current reference signal $I1_{RF}$. In this case, the third control arrangement 13 provides a third control signal C3 that basically coincides with the control signal C1 provided by the first control arrangement 11.

According to an embodiment of the invention, the third control arrangement 13 comprises a fifth control module 131, a sixth control module 132 and a seventh control module 133 logically arranged in cascade.

The fifth control module 131 is configured to receive and process the third signal $I1_{REF}$ and the third detection signal $I1_{ACM}$ and provide a third error signal $I1_E$ indicative of a difference between the second signal $P2_{REF}$ and the second detection signal $P2_{DCM}$.

The sixth control module 132 is configured to receive and process the third error signal $I1_E$ and provide the second control signal C2.

The seventh processing module 133 is configured to receive and process the first control signal C1 and the second control signal C2 and provide the third control signal C3.

According to an embodiment of the invention, the third control arrangement 13 is implemented at level of the transmitter-side controllers 6. In this case, the third control arrangement 13 may include control modules conveniently implemented by executable sets of software instructions stored by the transmitter-side controllers 6.

In a further aspect, the present invention relates to a control method for controlling the operation of a power transfer system 1 as described above.

The method, according to the invention, comprises controlling the second DC power $P2_{DC}$ received by the battery 200 and providing fast responsive control functionalities of the first DC power $P1_{DC}$ provided by the DC-bus stage 22 by controlling the operation of at least one of the rectifying stage 21 and the DC-bus stage 22.

According to a preferred embodiment, the method, according to the invention, comprises the following steps:
controlling the first DC power $P1_{DC}$ received by the DC-bus stage 22 by receiving and processing a first signal $P1_{REF}$ indicative of desired values for the first DC power $P1_{DC}$ and a first detection signal $P1_{DCM}$ indicative of measured values of said first DC power $P1_{DC}$ and by providing a first control signal C1 to control the operation of at least one of the rectifying stage 21 and the DC-bus stage 22;
controlling the second DC power $P2_{DC}$ received by the battery 200 by receiving and processing a second signal $P2_{REF}$ indicative of desired values for the second DC power $P2_{DC}$ and a second detection signal $P2_{DCM}$ indicative of measured values of the second DC power $P2_{DC}$ and by providing the first signal $P1_{REF}$.

Preferably, the step of controlling the first DC power $P1_{DC}$ provided by the DC-bus stage 22 comprises:
receiving and processing the first signal $P1_{REF}$ and the first detection signal $P1_{DCM}$ and providing a first error signal $P1_E$.
receiving and processing the first error signal $H_E$ and providing the first control signal C1.

Preferably, the step of controlling the second DC power $P2_{DC}$ received by the battery 200 comprises:
receiving and processing the second signal $P2_{REF}$ and the second detection signal $P2_{DCM}$ and providing a second error signal $P2_E$ indicative of a difference between the second signal $P2_{REF}$ and the second detection signal $P2_{DCM}$;
receiving and processing the second error signal $P2_E$ and providing the first signal $P1_{REF}$.

Preferably, the method, according to the invention, comprises the step of controlling the first AC current $I1_{AC}$ provided by the inverter stage 23 by receiving and processing a third signal $I1_{REF}$ indicative of desired values for the first AC current $I1_{AC}$ and a third detection signal $I1_{ACM}$ indicative of measured values of the first AC current $I1_{AC}$, by calculating a second control signal C2 and by processing the first and second control signals C1, C2 to provide a third control signal C3 to control the operation of at least one of the rectifying stage 21 and the DC-bus stage 22.

Preferably, the step of controlling the first AC current $I1_{AC}$ provided by the inverter stage 23 comprises:
receiving and processing the third signal $I1_{REF}$ and the third detection signal $I1_{ACM}$ and providing a third error signal $I3_E$, which may be indicative of a difference between the third signal $I1_{REF}$ and the third detection signal $I1_{ACM}$;
receiving and processing the third error signal $I1_E$ and providing the second control signal C2;
receiving and processing the first and second control signals C1, C2 to provide the third control signal C3.

The power transfer system, according to the invention, allows achieving the intended aims and objects.

The power transfer system, according to the invention, includes a control architecture ensuring a suitable transmission of electric power to the battery on board a vehicle, in accordance with a given power transfer profile, and, at the same time, ensuring fast control functionalities particularly adapted to implement safety control functionalities.

In a preferred embodiment, the power transfer system, according to the invention, allows suitable controlling the current flowing in the transmitter coil, thereby ensuring that safety current values are not exceeded.

Thanks to its innovative control architecture, the power transfer system, according to the invention, ensures good performances in terms of reliability, even when safety control functionalities are requested to be implemented.

The power transfer system, according to the invention, can be easily arranged and produced at industrial level, at competitive costs with respect to similar systems of the state of the art.

The invention claimed is:

1. A power transfer system for exchanging electric power between an electric power system and a battery of an electric vehicle comprising:
a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;
a transmitter-side coil sub-system electrically coupled with said inverter stage and adapted to receive said first AC power, said transmitter-side coil sub-system comprising a transmitter coil adapted to receive a first AC current;
one or more transmitter-side controllers adapted to control operation of said transmitter-side power sub-system and transmitter-side coil sub-system;
a receiver-side coil sub-system comprising a receiver coil inductively coupleable with said transmitter coil, said receiver-side coil sub-system being adapted to exchange an AC power with said transmitter-side coil sub-system;
a receiver-side power sub-system comprising a second rectifying stage electrically coupled with said receiver-side coil sub-system and adapted to exchange a second AC power with said receiver-side coil sub-system, said second rectifying stage being electrically coupleable with said battery and adapted to provide a second DC power to said battery;
one or more receiver-side controllers adapted to control operation of said receiver-side coil sub-system and receiver-side power sub-system, said transmitter-side and receiver-side controllers being capable to mutually communicate through a wireless communication channel;
wherein said transmitter-side and receiver-side controllers implement a control architecture adapted to control the second DC power received by said battery and adapted to provide fast responsive control functionalities of the first DC power provided by said DC-bus stage by controlling operation of at least one of said first rectifying stage and said DC-bus stage,
wherein said control architecture includes:
a first control arrangement configured to form a first closed-loop control arrangement and adapted to control the first DC power provided by said DC-bus stage, the first control arrangement being configured to receive and process a first signal indicative of desired values for said first DC power and a first detection signal indicative of measured values of said first DC power and provide a first control signal to control operation of at least one of said first rectifying stage and said DC-bus stage based on the first signal and the first detection signal; and a second control arrangement configured to form a second closed-loop control arrangement and adapted to control the second DC power received by said battery, the second control arrangement being configured to receive and process a second signal indicative of desired values for said second DC power and a second detection signal indicative of measured values of said second DC power and provide said first signal based on the second signal and the second detection signal.

2. The power transfer system, according to claim 1, wherein said control architecture comprises a control arrangement to control the first DC power provided by said DC-bus stage, which is implemented at level of said one or more transmitter-side controllers.

3. The power transfer system, according to claim 2, wherein said control architecture comprises a control arrangement to control the second DC power received by said battery, which is implemented at level of said transmitter-side controllers, said one or more transmitter-side controllers being adapted to receive said second signal and said second detection signal from said one or more receiver-side controllers through said wireless communication channel.

4. The power transfer system, according to claim 3, wherein said control architecture is adapted to control a first AC current provided by said inverter stage, said control architecture being configured to receive and process a third signal indicative of desired values for said first AC current and a third detection signal indicative of measured values of said first AC current and calculate a second control signal, said control architecture being configured to process said first and second control signals to provide a third control signal to control operation of at least one of said first rectifying stage and said first DC-bus stage.

5. The power transfer system, according to claim 4, wherein said architecture comprises a control arrangement to control the first AC current provided by said inverter stage, which is implemented at level of said one or more transmitter-side controllers.

6. The power transfer system, according to claim 2, wherein said control architecture comprises a control arrangement to control the second DC power received by said battery, which is implemented at level of said one or more receiver-side controllers, said one or more transmitter-side controllers being adapted to receive said first signal from said one or more receiver-side controllers through said wireless communication channel.

7. The power transfer system, according to claim 6, wherein said control architecture is adapted to control a first AC current provided by said inverter stage, said control architecture being configured to receive and process a third signal indicative of desired values for said first AC current and a third detection signal indicative of measured values of said first AC current and calculate a second control signal, said control architecture being configured to process said first and second control signals to provide a third control signal to control operation of at least one of said first rectifying stage and said first DC-bus stage.

8. The power transfer system, according to claim 7, wherein said control architecture comprises a control arrangement to control the first AC current provided by said inverter stage, which is implemented at level of said one or more transmitter-side controllers.

9. The power transfer system, according to claim 1, wherein said transmitter-side power sub-system and one or more transmitter-side controllers are arranged in a wall-box device for an electric vehicle charging facility.

10. The power transfer system, according to claim 1, wherein said transmitter-side coil sub-system and one or more transmitter-side controllers are arranged or embedded in a ground pad device for an electric vehicle charging facility.

11. The power transfer system, according to claim 1, wherein said receiver-side coil sub-system, said receiver-side power sub-system, said receiver-side controllers and said battery are arranged on board said electric vehicle.

12. The power transfer system, according to claim 1, wherein said control architecture is adapted to control a first AC current provided by said inverter stage, said control architecture being configured to receive and process a third signal indicative of desired values for said first AC current and a third detection signal indicative of measured values of said first AC current and calculate a second control signal, said control architecture being configured to process said first and second control signals to provide a third control signal to control operation of at least one of said first rectifying stage and said first DC-bus stage.

13. A method for controlling a power transfer system for exchanging electric power between an electric power system and a battery of an electric vehicle, said power transfer system comprising:

a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;

a transmitter-side coil sub-system electrically coupled with said inverter stage and adapted to receive said first AC power, said transmitter-side coil sub-system comprising a transmitter coil adapted to receive a first AC current;

a receiver-side coil sub-system comprising a receiver coil inductively coupleable with said transmitter coil, said receiver-side coil sub-system being adapted to exchange an AC power with said transmitter-side coil sub-system;

a receiver-side power sub-system comprising a second rectifying stage electrically coupled with said receiver-side coil sub-system and adapted to exchange a second AC power with said receiver-side coil sub-system, said second rectifying stage being electrically coupleable with said battery and adapted to provide a second DC power to said battery;

said method comprising controlling the second DC power received by said battery and providing fast responsive control functionalities of the first DC power provided by said DC-bus stage by controlling operation of at least one of said first rectifying stage and said DC-bus stage, wherein the method further comprises:

controlling, via a first control arrangement, the first DC power received by said DC-bus stage by receiving and processing, via the first control arrangement, a first signal indicative of desired values for said first DC power and a first detection signal indicative of measured values of said first DC power and by providing a first control signal to control operation of at least one of said first rectifying stage and said DC-bus stage based on the first signal and the first detection signal; and controlling, via a second control arrangement, the second DC power received by said battery by receiving and processing, via the second control arrangement, a second signal indicative of desired values for said second DC power and a second detection signal indicative of measured values of said second DC power and providing said first signal based on the second signal and the second detection signal.

14. The method, according to claim 13, which further comprises controlling a first AC current provided by said inverter stage by receiving and processing a third signal indicative of desired values for said first AC current and a third detection signal indicative of measured values of said first AC current, calculating a second control signal and processing said first and second control signals to provide a third control signal to control operation of at least one of said first rectifying stage and said DC-bus stage.

* * * * *